United States Patent
Moorthy et al.

(10) Patent No.: US 10,887,609 B2
(45) Date of Patent: Jan. 5, 2021

(54) TECHNIQUES FOR OPTIMIZING ENCODING TASKS

(71) Applicant: NETFLIX, INC., Los Gatos, CA (US)

(72) Inventors: Anush Moorthy, Redwood City, CA (US); Megha Manohara, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 312 days.

(21) Appl. No.: 15/840,998

(22) Filed: Dec. 13, 2017

(65) Prior Publication Data
US 2019/0182493 A1  Jun. 13, 2019

(51) Int. Cl.
*H04N 19/179* (2014.01)
*H04N 19/436* (2014.01)
*H04N 19/115* (2014.01)
*H04N 19/85* (2014.01)
*H04N 21/845* (2011.01)
*H04N 19/146* (2014.01)

(52) U.S. Cl.
CPC ......... *H04N 19/179* (2014.11); *H04N 19/115* (2014.11); *H04N 19/146* (2014.11); *H04N 19/436* (2014.11); *H04N 19/85* (2014.11); *H04N 21/8456* (2013.01)

(58) Field of Classification Search
CPC .................................................. H04N 19/179
See application file for complete search history.

(56) References Cited

U.S. PATENT DOCUMENTS

| | | | |
|---|---|---|---|
| 9,338,467 B1 * | 5/2016 | Gadepalli | H04N 19/127 |
| 2012/0147958 A1 * | 6/2012 | Ronca | H04N 19/14 375/240.16 |
| 2013/0272374 A1 | 10/2013 | Eswaran et al. | |
| 2014/0139733 A1 * | 5/2014 | MacInnis | H04N 19/124 348/441 |
| 2017/0078686 A1 | 3/2017 | Coward et al. | |

FOREIGN PATENT DOCUMENTS

WO  2016/130696 A1  8/2016

OTHER PUBLICATIONS

International Search Report for application No. PCT/US2018/064825 dated Apr. 2, 2019.

* cited by examiner

*Primary Examiner* — James M Anderson, II
(74) *Attorney, Agent, or Firm* — Artegis Law Group, LLP

(57) ABSTRACT

In various embodiments, a shot collation application causes multiple encoding instances to encode a source video sequence that includes at least two shot sequences. The shot collation application assigns a first shot sequence to a first chunk. Subsequently, the shot collation application determines that a second shot sequence does not meet a collation criterion with respect to the first chunk. Consequently, the shot collation application assigns the second shot sequence or a third shot sequence derived from the second shot sequence to a second chunk. The shot collation application causes a first encoding instance to independently encode each shot sequence assigned to the first chunk. Similarly, the shot collation application causes a second encoding instance to independently encode each shot sequence assigned to the second chunk. Finally, a chunk assembler combines the first encoded chunk and the second encoded chunk to generate an encoded video sequence.

20 Claims, 5 Drawing Sheets

US 10,887,609 B2

TECHNIQUES FOR OPTIMIZING ENCODING TASKS

BACKGROUND OF THE INVENTION

Field of the Invention

Embodiments of the present invention relate generally to video technology and, more specifically, to techniques for optimizing encoding tasks.

Description of the Related Art

Efficiently encoding source video sequences is essential for real-time delivery of the source video sequences. To reduce overall encoding time, a typical streaming video provider may implement a distributed encoding system that parallelizes the encoding work across multiple encoding instances. In addition to parallelizing the encoding work, some streaming video providers implement a shot-based distributed encoding system that, for each shot, individualizes the encoding parameters for the shot to generate a corresponding encoded shot that satisfies a particular quality level for the bit rate used during the encoding process.

In a typical shot-based distributed encoding system, an encoding preprocessor subdivides a source video sequence into individual shot sequences. Each shot sequence includes a set of frames that usually have similar spatial-temporal properties and run for an uninterrupted period of time. For each shot sequence, the encoding preprocessor generates a different encoding task and adds the encoding task to a task queue. When an encoding instance becomes available, a centralized messaging subsystem transmits the next encoding task from the task queue to the encoding instance. The encoding instance selects shot-specific encoding parameters based on a target quality level and then encodes the shot sequence based on the shot-specific encoding parameters. Finally, an assembler composites the individually encoded shot sequences to generate the overall encoded video sequence.

One limitation of shot-based distributed encoding systems is that the number of encoding tasks required to prepare a source video sequence for real-time delivery can be undesirably large. More specifically, to optimize viewing experiences across a wide range of different internet connections and different viewing devices, a streaming service provider typically provides multiple encoded video sequences for each source video sequence. For example, for each source video sequence, a streaming service provider could provide 441 different encoded video sequences, where each encoded video sequence represents a different permutation of 63 target quality levels and 7 resolutions. To prepare a source video sequence that includes 2915 shots for real-time delivery, the shot-based encoding system would generate 1,285,515 different encoding tasks—one task for each shot across the 441 different encoded video sequences.

As the number of encoding tasks increases, both the bandwidth required to transmit the encoding tasks from the task queue to the encoding instances and the memory required to store the encoding tasks in the task queue increase. Consequently, as the number of encoding tasks increases, the overall performance of the centralized messaging subsystem and the shot-based distributed encoding system may decrease. Further, when preparing a library of potentially hundreds of source video sequences for real-time delivery, the memory required to store the undistributed encoding tasks may exceed the memory allocated to the task queue. As a result, the shot-based distributed encoding system may be unable to properly encode the different source video sequences and may even cease functioning.

As the foregoing illustrates, what is needed in the art are more efficient techniques for encoding video sequences.

SUMMARY OF THE INVENTION

One embodiment of the present invention sets forth a computer-implemented method for encoding video sequences. The method includes assigning a first shot sequence included in a source video sequence to a first chunk; determining that a second shot sequence included in the source video sequence does not satisfy at least one collation criterion with respect to the first chunk; assigning the second shot sequence or a third shot sequence derived from the second shot sequence to a second chunk; causing a first encoding instance to independently encode each shot sequence assigned to the first chunk to generate a first encoded chunk; and causing a second encoding instance to independently encode each shot sequence assigned to the second chunk to generate a second encoded chunk, where the first encoded chunk and the second encoded chunk are combined to generate at least part of an encoded video sequence.

One advantage of the disclosed techniques is that, because the shot sequences are collated into chunks, the number of separate encoding tasks required to distribute shot-based encoding work to the encoding instances is equal to the number of chunks. Notably, the number of chunks can be substantially less than the number of shot sequences. Consequently, resource inefficiencies attributable to the number of encoding tasks experienced with conventional shot-based encoding distribution systems can be substantially mitigated. Further, the collation criterion may be selected to ensure that the chunks satisfy requirements for specific types of encoders (e.g., alignment of shot sequence boundaries with group-of-pictures boundaries).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

The disclosed techniques may be used to efficiently encode source video sequences for real-time delivery. First, a shot analyzer partitions a source video sequence into shot sequences and transmits the shot sequences to a strategy engine. Upon receiving the shot sequences, the strategy engine evaluates characteristics of the shot sequences in conjunction with resource constraints to select collation criteria that guide the assignment of shots to chunks. For each shot sequence, a shot-to-chunk mapper assigns the shot sequence to a chunk based on the collation criteria. Notably, the shot-to-chunk mapper may assign multiple shot sequences to a single chunk.

As a task generator receives individual shot assignments from the shot-to-chunk mapper, the task generator generates one or more chunks. For each chunk, the task generator generates an associating encoding task and stores the encoding task in a task queue. Each encoding task is distributed to one of multiple encoding instances included in a parallel encoder. For each encoding task, the associated encoding instance generates an individual encoded chunk within which each shot sequence is individually encoded with potentially different encoding parameters. Finally, a chunk assembler composites the individual encoded chunks to generate the encoded video sequence.

Advantageously, by assigning shot sequences to chunks based on the collation criteria, the overall efficiency associated with encoding the source video sequence is optimized with respect to the available resources. Notably, the number of separate encoding tasks required to distribute shot-based encoding work to the encoding instances is equal to the number of chunks, and the number of chunks is often less than the number of shot sequences.

System Overview

Figure 1:
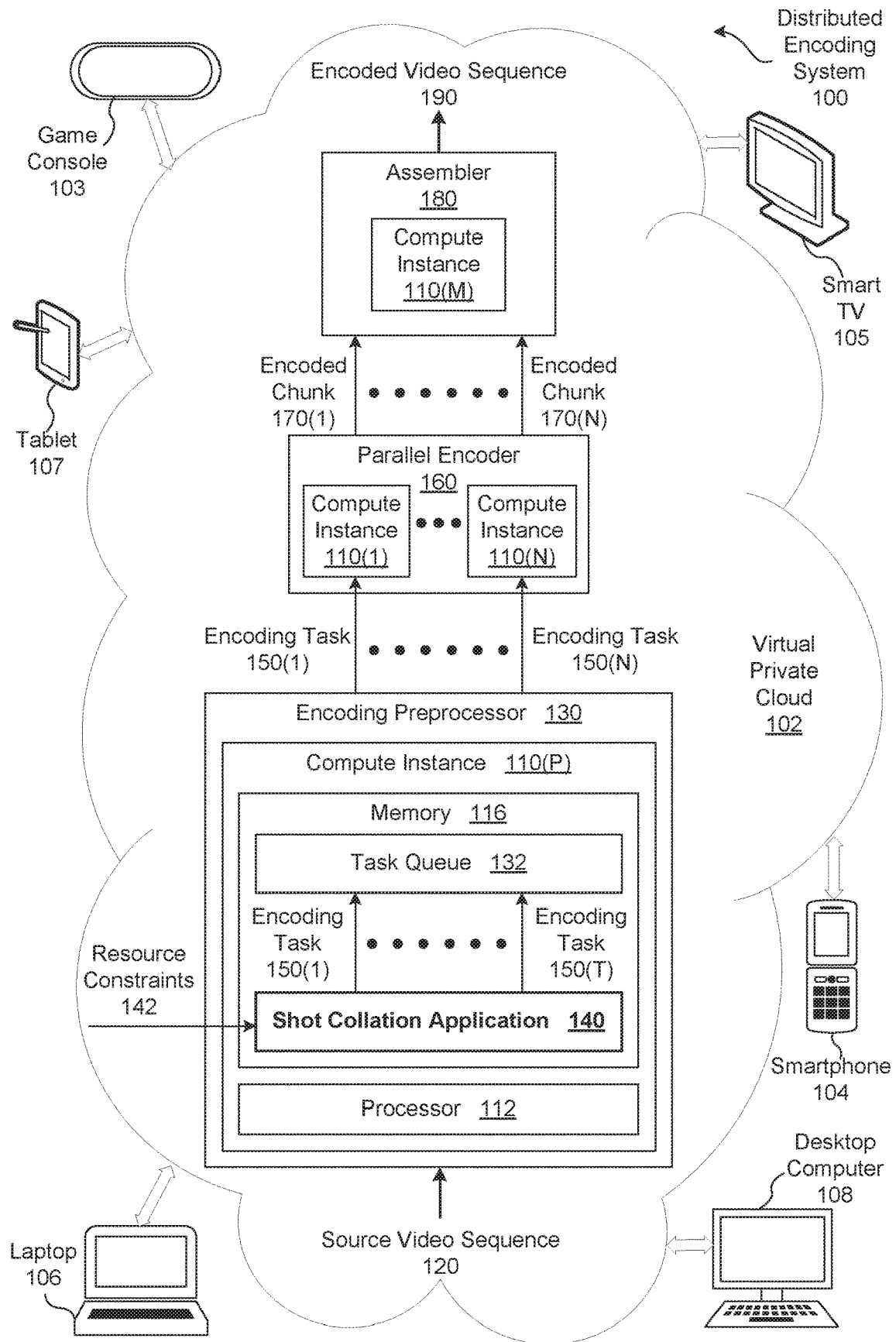
FIG. 1 is a conceptual illustration of a distributed encoding system configured to implement one or more aspects of the present invention.

FIG. 1 is a conceptual illustration of a distributed encoding system 100 configured to implement one or more aspects of the present invention. As shown, the distributed encoding system 100 includes a virtual private cloud (i.e., encapsulated shared resources, software, data, etc.) 102 connected to a variety of devices capable of transmitting input data and/or displaying video content. Such devices include, without limitation, a game console 103, a smartphone 104, a smart television (TV) 105, a laptop 106, a tablet 107, and a desktop computer 108. In alternate embodiments, the distributed encoding system 100 may include any number and/or type of input, output, and/or input/output devices in any combination.

The virtual private cloud 102 includes, without limitation, any number and type of the compute instances 110. The virtual private cloud 102 receives input user information from an input device (e.g., the laptop 106), one or more computer instances 110 operate on the user information, and the virtual private cloud 102 transmits processed information to the user. The virtual private cloud 102 conveys output information to the user via display capabilities of any number of devices, such as a conventional cathode ray tube, liquid crystal display, light-emitting diode, or the like.

In alternate embodiments, the virtual private cloud 102 may be replaced with any type of cloud computing environment, such as a public or a hybrid cloud. In other embodiments, the distributed encoding system 100 may include any distributed computer system instead of the virtual private cloud 102. In yet other embodiments, the distributed encoding system 100 does not include the virtual private cloud 102 and, instead, the distributed encoding system 100 includes a single computing unit that implements multiple processors (e.g., central processing units and/or graphical processing units in any combination).

For explanatory purposes, multiple instances of like objects are denoted with reference numbers identifying the object and parenthetical numbers identifying the instance where needed. As shown for the compute instance 110(P), each compute instance 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, the compute instances 110 included in the virtual private cloud 102 are configured to implement one or more applications. More specifically, the compute instances 110 included in the distributed encoding system 100 are configured to encode source video sequences 120 for real-time delivery of the source video sequences 120 as encoded video sequences 190. Because efficiently encoding the source video sequences 120 is essential for real-time delivery of the source video sequences 120, the distributed encoding system 100 parallelizes the encoding work across multiple compute instances 110.

As shown, the compute instance 110(P) is configured as an encoding preprocessor 130, the compute instances 110(1)-110(N) are configured as a parallel encoder 160, and the compute instance 110(M) is configured as an assembler 180. The compute instances 110(1)-110(N) that are configured as the parallel encoder 160 are also referred to herein as "encoding instances." To optimize encoding time, each of the encoding instances performs encoding operations independently and substantially in parallel. As referred to herein, performing encoding operations "substantially in parallel," comprises performing different portions of encoding work, where performing the different portions of the encoding work overlap partially or fully in time.

In alternate embodiments, any number of the compute instances 110 may be configured as the encoding processor 130, the parallel encoder 160, and the assembler 180, in any combination. For example, in some embodiments, the compute instance 110(1) could be configured as both the encoding preprocessor 130 and the assembler 180, and the compute instances 110(2)-110(33) could be configured as the parallel encoder 160.

Some streaming video providers implement a conventional shot-based distributed encoding system, that, for each shot, individualizes the encoding parameters for the shot to generate a corresponding encoded shot that satisfies a particular quality level for the bit rate used during the encoding process. As a general matter, each shot sequence includes a set of frames that usually have similar spatial-temporal properties and run for an uninterrupted period of time. For each shot sequence, a conventional encoding preprocessor generates a different encoding task and adds the encoding task to a task queue. When an encoding instance becomes available, a centralized messaging subsystem transmits the next encoding task from the task queue to the encoding instance. The encoding instance selects shot-specific encoding parameters based on a target quality level and then encodes the shot sequence based on the shot-specific encoding parameters. Finally, an assembler composites the individually encoded shot sequences to generate the overall encoded video sequence.

One limitation of conventional shot-based distributed encoding systems is that the number of encoding tasks required to prepare a source video sequence for real-time delivery can be undesirably large. More specifically, to optimize viewing experiences across a wide range of different internet connections and different viewing devices, a streaming service provider typically provides multiple encoded video sequences for each source video sequence. For example, for each source video sequence, a streaming service provider could provide 441 different encoded video sequences, where each encoded video sequence represents a different permutation of 63 target quality levels and 7 resolutions. To prepare a source video sequence that includes 2915 shots for real-time delivery, the shot-based encoding system would generate 1,285,515 different encoding tasks—one task for each shot across the 441 different encoded video sequences.

As the number of encoding tasks increases, both the bandwidth required to transmit the encoding tasks from the task queue to the encoding instances and the memory required to store the encoding tasks in the task queue increase. Consequently, as the number of encoding tasks increases, the overall performance of the centralized messaging subsystem and the shot-based distributed encoding system may decrease. Further, when preparing a library of potentially hundreds of source video sequences for real-time delivery, the memory required to store the undistributed encoding tasks may exceed the memory allocated to the task queue. As a result, the conventional shot-based distributed encoding system may be unable to properly encode the different source video sequences and may even cease functioning.

Optimizing Resource Efficiency for Shot-Based Encoding

To address the aforementioned limitations of conventional shot-based encoding systems, the encoding preprocessor 130 includes, without limitation, a shot collation application 140. The shot collation application 140 resides in the memory 116 associated with one or more of the compute instances 110 and executes on the processor 112 associated with one or more of the compute instances 110.

Figure 2:
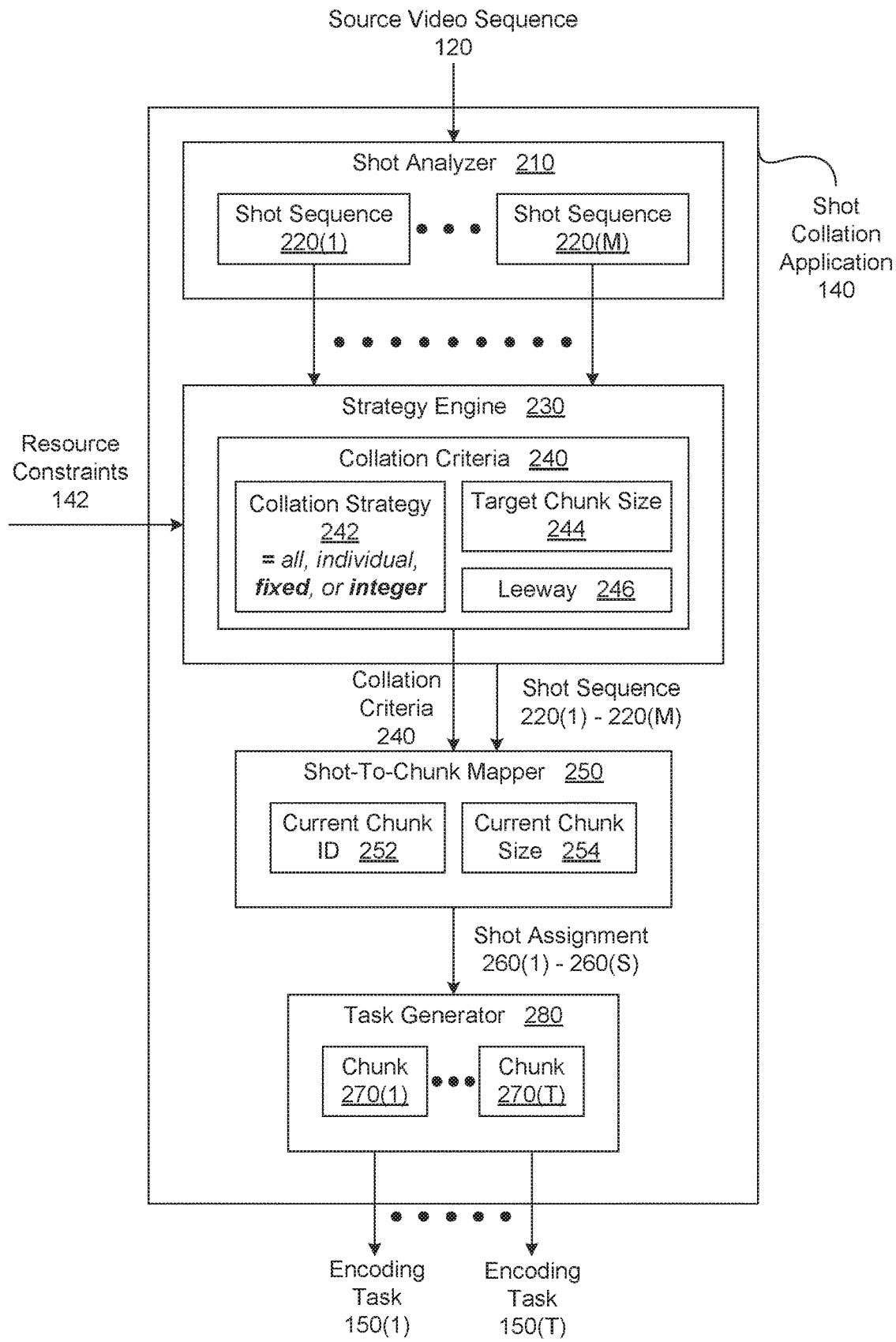
FIG. 2 is a more detailed illustration of the shot collation application of FIG. 1, according to various embodiments of the present invention.

As described in greater detail in conjunction with FIG. 2, the shot collation application 140 partitions the source video sequence 120 into shot sequences (not shown in FIG. 1). Subsequently, the shot collation application 140 analyzes the shot sequences in conjunction with resource constraints 142 to determine collation criteria (not shown in FIG. 1). Examples of resource constraints 140 include a memory bandwidth, the size of a task queue 132, a maximum number of encoding tasks 150, and a characteristic associated with the encoding instances, to name a few. The collation criteria include, without limitation, a collation strategy. The shot collation application 140 then distributes the shot sequences across one or more chunks based on the collation criteria. As referred to herein, a "chunk" comprises one or more shot sequences.

For instance, in some embodiments, the collation strategy is "all," "individual," "fixed," or "integer." For the collation strategy of all, the shot collation application 140 sequentially assigns all of the shot sequences to a single chunk. For the collation strategy of individual, the shot collation application 140 sequentially assigns each shot sequence to a different chunk. The collation strategy of fixed is associated with an additional collation constraint specifying a target chunk size. For the collation strategy of fixed, the shot collation application 140 sequentially assigns shot sequences to each chunk, subdividing shot sequences as necessary to ensure that the size of each of the chunks equals the target chunk size. The collation strategy of integer is also associated with an additional collation constraint specifying a target chunk size. For a collation strategy of integer, the shot collation application 140 sequentially assigns an integer number of shot sequences to each chunk while ensuring that the size of each chunk does not exceed the target chunk size.

In general, the shot collation application 140 selects collation criteria that mitigate limitations associated with conventional shot-based encoding systems. For example, if the number of shot sequences is relatively high and/or the resource constraints 142 indicate that the memory bandwidth is relatively low, then the shot collation application 140 selects a collation strategy of fixed or integer. Further, the shot collation application 140 selects a target chunk size that ensures that the number of the encode tasks 150 is substantially less than the number of shot sequences. In some embodiments, if the resource constraints 142 indicate that the encode instances require each of the encoding tasks 150 to align with a group-of-pictures (GOP) boundary, then the shot collation application 140 may select a collation strategy of fixed and a target chunk size that is a multiple of the size of a GOP.

For each chunk, the shot collation application 140 generates a different encoding task 150 and adds the encoding task 150 to the task queue 132. As a general matter, if the shot collation application 140 generates T chunks, then the shot collation application 140 also generates the encoding tasks 150(1)-150(T). When an encoding instance becomes available, a centralized messaging subsystem transmits the next encoding task 150 from the task queue 132 to the encoding instance.

The encoding task 150($x$) configures an encoding instance to sequentially and independently encode each shot sequence included in the corresponding chunk to generate an encoded chunk 170($x$). For each shot sequence, the encoding instance selects shot-specific encoding parameters based on a target quality level and then encodes the shot sequence based on the shot-specific encoding parameters. Accordingly, within the encoded chunk 170($x$), each shot sequence is encoded with potentially different parameters. Subsequently, the encoding instance composites the different encoded shot sequences to generate the encoded chunk 170($x$).

After the encoding instances have finished generating the encoded chunks 170(1)-170(T), the assembler 180 composites the individual encoded chunks 170 to generate the encoded video sequence 190. Advantageously, each shot sequence within the encoded video sequence 190 is encoded with potentially different encoding parameters. Consequently, the distributed encoding system 100 provides the encoding efficiency inherent in optimizing encoding parameters individually for each shot sequence. Further, by customizing the collation criteria to control the number of the encoding tasks 150, the shot collation application 140 mitigates resource inefficiency and inflexibility often associated with conventional shot-based distributed encoding systems.

It will be appreciated that the distributed encoding system 100 shown herein is illustrative and that variations and modifications are possible. For example the functionality provided by the shot collation application 140, the parallel encoder 160, and the assembler 180 as described herein may be integrated into or distributed across any number of software applications (including one) and any number of components of the distributed encoding system 100. Further, the connection topology between the various units in FIG. 1 may be modified as desired.

Note that the techniques described herein are illustrative rather than restrictive, and may be altered without departing from the broader spirit and scope of the invention. For instance, in some embodiments, each of the encode instances may determine any number and type of encoding parameters for each shot sequence in any technically feasible fashion. In the same or other embodiments, the encoding preprocessor 130 may not include a centralized messaging system and/or the shot collation application 140 may not include the task queue 132. In such embodiments, the shot collation application and/or the encoding preprocessor 130 may transmit the encoding tasks 150 to the encoding instances in any technically feasible fashion.

Collating Shot Sequences into Chunks

FIG. 2 is a more detailed illustration of the shot collation application 140 of FIG. 1, according to various embodiments of the present invention. As shown, the shot collation application 140 includes, without limitation, a shot analyzer 210, a strategy engine 230, a shot-to-chunk mapper 250, and a task generator 280.

In operation, the shot analyzer 210 receives the source video sequence 120 and partitions the source video sequence 120 into any number of the shot sequences 220. Each of the shot sequences 220 includes a set of frames that usually have similar spatial-temporal properties and run for an uninterrupted period of time. The shot analyzer 210 may partition the source video sequence 120 into the shot sequences 220 in any technically feasible fashion. For instance, the shot analyzer 210 may implement one or more shot detection algorithms.

The strategy engine 230 receives the shot sequences 220 as well as the resource constraints 142 and generates collation criteria 240. As shown, the collation criteria 240 include, without limitation, a collation strategy 242, a target chunk size 244, and a leeway 246. As described previously herein in conjunction with FIG. 1, the collation strategy 242 specifies an algorithm for collating the shot sequences 220 in chunks 270. Examples of the collation strategy 242 include, without limitation, all, individual, fixed, and integer. The target chunk size 244 specifies an optimal size for each of the chunks 270. In a complementary fashion, the leeway 246 specifies an acceptable deviation from the target chunk size 244.

Notably, the shot collation application 140 enforces the target chunk size 244 and the leeway 246 when the collation strategy 242 is equal to fixed or integer, but disregards the target chunk size 244 and the leeway 246 when the collation strategy is equal to all or individual. For example, if the collation strategy 242 is equal to fixed or integer, the target chunk size 244 is 180 seconds, and the leeway is 10 seconds, then the shot collation application 140 ensures that the size of each of the chunks 270 lies between 170 seconds to 190 seconds. By contrast, when the collation strategy 242 is equal to all, the shot collation application 140 generates the single chunk 170 having the size of the source video sequence 120. When the collation strategy 242 is equal to individual, for each of the shot sequences 220(x), the shot collation application 140 generates a different chunk 170(x) having the size of the shot sequence 220(x).

In various embodiments, the shot collation application 140 determines and/or enforces a different set of collation criteria 240 based on the collation strategy 242. For instance, in some embodiments, if the collation strategy 242 is equal to all or individual, then the strategy engine 230 determines neither the target chunk size 244 nor the leeway 246. In the same or other embodiments, the collation criteria 240 include a maximum chunk size that is applicable when the collation strategy 230 is equal to individual. In such embodiments, if the strategy engine 230 sets the collation strategy 242 equal to individual, then the strategy engine 230 determines the maximum chunk size. If the size of a particular shot sequence 220 exceeds the maximum chunk size, then the shot collation application 140 subdivides the shot sequence 220 into multiple shot sequences 220, each having a size that does not exceed the maximum chunk size.

In alternate embodiments, the strategy engine 230 may generate any number and type of collation criteria 240 in any technically feasible fashion based on any type of data. For instance, in some embodiments, the supported values for the collation strategies 242 may vary from the all, individual, fitted, and integer collation strategies described herein. In the same or other embodiments, the strategy engine 230 may receive and/or determine the values for the collation criteria 240 based on data received via a graphical user interface.

The shot-to-chunk mapper 250 receives the shot sequences 220 and the collation criteria 240 and generates shot assignments 260. The shot-to-chunk mapper 250 may receive the shot sequence 220 sequentially, concurrently, or any combination thereof. However, the shot-to-chunk mapper 250 processes the shot sequences 220 in the order in which the shot sequences occur in a video timeline associated with the source video sequence 120.

As shown, the shot-to-chunk mapper 250 includes, without limitation, a current chunk identifier (ID) 252 and a current chunk size 254. The current chunk identifier 252 uniquely specifies a chunk 270 to be generated by the task generator 280. In general, the task generator 280 generates the chunks 270 after the shot-to-chunk mapper 250 generates the shot assignments 260. However, for explanatory purposes only, the chunk 270 specified by the current chunk identifier 252 is referred to herein as the "current chunk 270" irrespective of whether the chunk 270 has actually been generated by the task generator 280. The current chunk size 254 stores the size of the current chunk 270 based on the shot assignments 260 previously generated.

Initially, the shot-to-chunk mapper 250 sets the current chunk identifier 252 equal to 1 and the current chunk size 254 equal to 0. If the collation strategy 242 is equal to fixed or integer, then the shot-to-chunk mapper 250 calculates a maximum chunk size (not shown) as the sum of the target shot size 244 and the leeway 246.

The shot-to-chunk mapper 250 then sequentially (with respect to the video timeline) processes each of the shot sequences 220 based on the collation criteria 240. If the collation strategy 242 is equal to all, then the shot-to-chunk mapper 250 generates the shot assignment 260(x) that assigns the shot sequence 220(x) to the current chunk 270 (the single chunk 270(1)). The shot-to-chunk mapper 250 then processes the next shot sequence 220(x+1). If, however, the collation strategy is equal to individual, then the shot-to-chunk mapper 250 generates the shot assignment 260(x) that assigns the shot sequence 220(x) to the current chunk 270 (the chunk 270(x)). The shot-to-chunk mapper 250 then increments the current chunk identifier 252 and processes the next shot sequence 220(x+1).

If the collation strategy 242 is equal to fixed, then the shot-to-chunk mapper 250 sums the size of the shot sequence 220(x) and the current chunk size 254 to generate a tentative chunk size. If the tentative chunk size does not exceed the maximum chunk size, then the shot-to-chunk mapper 250 generates the shot assignment 260 that assigns the shot sequence 220(x) to the current chunk 270. Subsequently, if the tentative chunk size is less than the target chunk size 244, then the shot-to-chunk mapper 250 sets the current chunk size 254 equal to the tentative chunk size. If, however, the tentative chunk size is greater than or equal to the target chunk size 244, then the shot-to-chunk mapper 250 increments the current chunk identifier 252 and sets the current chunk size 254 equal to 0. The shot-to-chunk mapper 250 then processes the next shot sequence 220(x+1).

If, however, the collation strategy 242 is equal to fixed and the tentative chunk size greater than the maximum chunk size, then the shot-to-chunk mapper 250 subdivides the shot sequence 220(x) into multiple shot sequences 220. The shot-to-chunk mapper 250 may subdivide the shot sequence 220(x) in any technically feasible fashion.

In some embodiments, to subdivide the shot sequence 220(x), the shot-to-chunk mapper 250 determines the initial subset of frames included in the shot sequence 220(x) that can be assigned to the current chunk 270 without exceeding the target chunk size 244. Then, the shot-to-chunk mapper 250 selects the frames included in the shot sequence 220(x) that are not also included in the initial subset. The shot-to-chunk mapper 250 assigns the selected frames to one or more new shot sequences 220 based on the target chunk size 244. Finally, the shot-to-chunk mapper 250 deletes the selected frames from the shot sequence 220(x). Notably, in some embodiments, the shot-to-chunk mapper 250 may perform any number of operations to properly generate the new shot sequences 220. For example, the shot-to-chunk mapper 250 could insert an inter frame (I frame) at the beginning of each new shot sequence 220.

After the shot-to-chunk mapper 250 subdivides the shot sequence 220(x) into multiple shot sequences 220, the shot-to-chunk mapper 250 generates the shot assignment 260 that assigns the cropped shot sequence 220(x) to the current chunk 270. For each newly generated shot sequence 220(x'), the shot-to-chunk mapper 250 increments the current chunk identifier 252 and generates the shot assignment 260 that assigns the shot sequence 220(x') to the new current chunk 270. Finally, if the size of the final shot sequence 220(x') is greater than or equal to the target chunk size 244, then the shot-to-chunk mapper 250 increments the current chunk identifier 252 and sets the current chunk size 254 equal to 0. If, however, the size of the final shot sequence 220(x') is less than the target chunk size 244, then the shot-to-chunk mapper 250 sets the current chunk size 254 equal to the size of the final shot sequence 220(x'). The shot-to-chunk mapper 250 then processes the next shot sequence 220(x+1).

If the collation strategy 242 is equal to integer and the size of the shot sequence 220(x) exceeds the maximum shot size, then the shot-to-chunk mapper 250 subdivides the shot sequence 220(x) into multiple shot sequences 220. The shot-to-chunk mapper 250 may subdivide the shot sequence 220(x) and assign the cropped shot sequence 220(x) and the additional shot sequences 220 in any technically feasible fashion that ensures that each of the chunks 270 satisfies the collation criteria 240. The shot to scene mapper 250 then processes the next shot sequence 220(x+1).

If the collation strategy 242 is equal to integer and the size of the shot sequence 220(x) does not exceed the maximum shot size, then the shot-to-chunk mapper 250 sums the size of the shot sequence 220(x) and the current chunk size 254 to generate a tentative chunk size. If the tentative chunk size does not exceed the maximum chunk size, then the shot-to-chunk mapper 250 generates the shot assignment 260 that assigns the shot sequence 220(x) to the current chunk 270. If, however, the tentative chunk size exceeds the maximum chunk size, then the shot-to-chunk mapper 250 increments the current chunk identifier 252 and sets the tentative chunk size equal to the size of the shot sequence 220(x). The shot-to-chunk mapper 250 then generates the shot assignment 260 that assigns the shot sequence 220(x) to the current chunk 270.

After generating the shot assignment 260 corresponding to the shot sequence 220(x), if the tentative chunk size does not lie within the leeway 246 of the target chunk size 244, then the shot-to-chunk mapper 250 sets the current chunk size 254 equal to the tentative chunk size. If, however, the tentative chunk size lies within the leeway 246 of the target chunk size 244, then the shot-to-chunk mapper 250 increments the current chunk identifier 252 and sets the current chunk size 254 equal to 0. The shot to scene mapper 250 then processes the next shot sequence 220(x+1).

As persons skilled in the art will recognize, because the shot to scene mapper 250 may subdivide any number of shot sequences 220 into multiple shot sequences 220, the number of the shot assignments 260 is not necessarily equal to the number of the shot sequences 220 generated by the shot analyzer 210.

In alternate embodiments, the shot-to-chunk mapper 250 may process the shot sequences 220 in any technically feasible order. For example, if the collation strategy 242 is equal to integer, then the shot-to-chunk mapper 250 could process the shot sequences 220 based on which of the shot sequences 220 best fits within the current chunk 270.

The task generator 280 generates the chunks 270 based on the shot assignments 260. The shot assignments 260 may be specified in any technically feasible fashion. For each chunk 270, the task generator 280 then generates the corresponding encoding task 150 and adds the encoding task 150 to the task queue 132.

It will be appreciated that the shot collation application 140 shown herein is illustrative and that variations and modifications are possible. For example the functionality provided by the shot collation application 140, the shot analyzer 210, the strategy engine 230, the shot-to-chunk mapper 250, and the task generator 280 as described herein may be integrated into or distributed across any number of software applications (including one) and any number of components of the distributed encoding system 100.

Note that the techniques described herein are illustrative rather than restrictive, and may be altered without departing from the broader spirit and scope of the invention. Many modifications and variations on the functionality provided by the shot collation application 140, the shot analyzer 210, the strategy engine 230, the shot-to-chunk mapper 250, and the task generator 280 will be apparent to those of ordinary skill in the art without departing from the scope and spirit of the described embodiments. For instance, in various embodiments, any number of the techniques or devices may be implemented while other techniques may be omitted or replaced in any technically feasible fashion.

Figure 3:
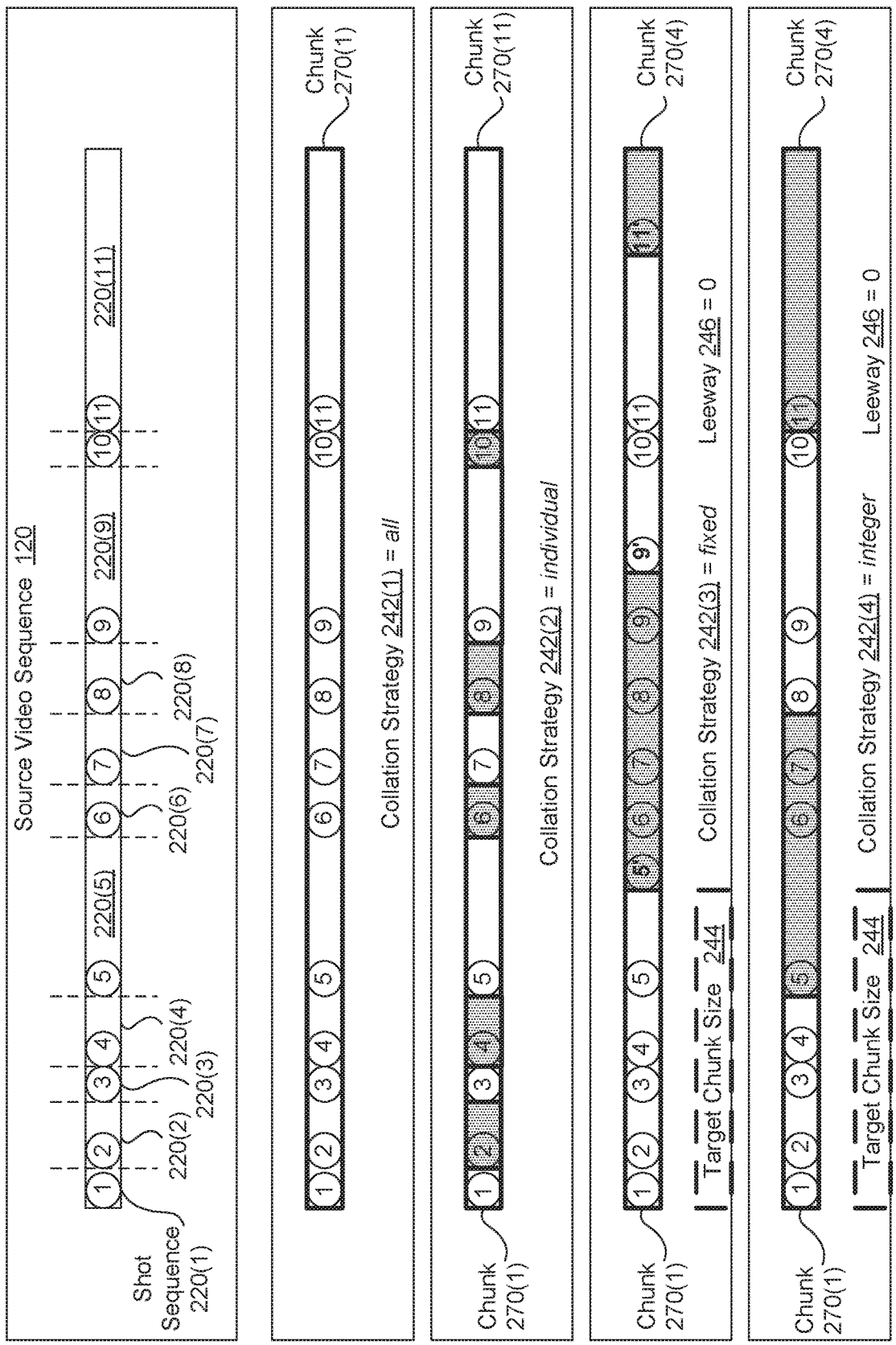
FIG. 3 illustrates different examples of the chunks generated by the shot collation application of FIG. 1 using different collation strategies, according to various embodiments of the present invention.

FIG. 3 illustrates different examples of the chunks 270 generated by the shot collation application 140 of FIG. 1 using different collation strategies 242, according to various embodiments of the present invention. As shown, the source video sequence 120 includes, without limitation, the eleven shot sequences 220(1)-220(11). For explanatory purposes, the start of each of the shot sequences 220 is depicted with a numbered bubble that is situated along a video timeline. For example, the start of the shot sequence 220(3) is depicted with the bubble numbered 3. For each of four collation strategies 242(1)-242(4), the chunks 270 generated by the shot collation application 140 are depicted as bold boxes alternating between filled and unfilled along a different depiction of the video timeline.

For the collation strategy 242(1) of all, the shot-to-chunk mapper 250 assigns all of the shot sequences 220(1)-220(11) to the single chunk 270(1) irrespective of any of the other collation criteria 240. The total number of the chunks 270 and, consequently, the total number of the encoding tasks 150 is one.

By contrast, when the collation strategy 242 is equal to individual, the shot-to-chunk mapper 250 assigns each of the shot sequences 220 to a different chunk 270 irrespective of any of the other collation criteria 240. As shown for the collation strategy 242(2) equal to individual, the shot-to-chunk mapper 250 assigns the shot sequence 220(1) to the chunk 270(1), the shot sequence 220(2) to the chunk 270(2), the shot sequence 220(3) to the chunk 270(3), and so forth. The total number of the chunks 270 and, consequently, the total number of the encoding tasks 150 is eleven. Notably, the size of each of the chunks 270 may vary from the size of the other chunks 270.

As described previously herein in conjunction with FIG. 2, the collation strategy 242(3) of fixed and the collation strategy 242(4) of integer are associated with the target chunk size 244 and the leeway 246. For explanatory purposes only, the leeway 246 is equal to zero and the target chunk size 244 is depicted as a bold dotted box, where the length of the box visually depicts a time interval along the video timeline.

In general, when the collation strategy 242 is equal to fixed, the shot-to-chunk mapper 250 sequentially assigns the shot sequences 220 to the chunks 270, subdividing the shot sequences 270 when necessary to ensure that each of the chunks 270 satisfies the target chunk size 244 and the leeway 246. For explanatory purposes only, a new shot sequence 220 resulting from a subdivision of a particular shot sequence 220(x) is depicted with a bubble specifying (x').

As shown for the collation strategy 242(3) of fixed, the shot-to-chunk mapper 250 assigns the shot sequences 220 (1)-220(4) to the chunk 270(1). The shot-to-chunk mapper 250 then subdivides the shot sequence 220(5) into a cropped shot sequence 220(5) and the shot sequence 220(5'), assigns the cropped shot sequence 220(5) to the chunk 270(1), and assigns the shot sequence 220(5') to the chunk 270(2). Subsequently, the shot-to-chunk mapper 250 assigns the shot sequences 220(6)-220(8) to the chunk 270(2). The shot-to-chunk mapper 250 then subdivides the shot sequence 220(9) into a cropped shot sequence 220(9) and the shot sequence 220(9'), assigns the cropped shot sequence 220(9) to the chunk 270(2), and assigns the shot sequence 220(9') to the chunk 270(3). The shot-to-chunk mapper 250 also assigns the shot sequence 220(10) to the chunk 270(3). Finally, the shot-to-chunk mapper 250 subdivides the shot sequence 220(11) into a cropped shot sequence 220(11) and the shot sequence 220(11'), assigns the cropped shot sequence 220(11) to the chunk 270(3), and assigns the shot sequence 220(11') to the chunk 270(4).

For the collation strategy 242(3) of fixed, the total number of chunks 270 is equal to four, and the number of shot sequences 220 is 14. Notably, because the leeway 246 is equal to zero, the size of each of the chunks 270(1)-270(3) is equal to the target chunk size 244. The size of the final chunk 270(4) is smaller than the target chunk size 244 because the chunk 270(4) includes the last frame of the source video sequence 120. In alternate embodiments in which the leeway 246 is not equal to zero, the size of each of the chunks 270 could be smaller or larger than the target chunk size 244 by as much as the leeway 246.

In general, when the collation strategy 242 is equal to integer, the shot-to-chunk mapper 250 computes a maximum chunk size based on the target chunk size 244 and the leeway 246. The shot-to-chunk mapper 250 then sequentially assigns an integer number of the shot sequences 220 to each of the chunks 270, while ensuring that the size of each of the chunks 270 does not exceed the maximum chunk size. If the size of a particular shot sequence 220 is greater than the maximum chunk size, then the shot-to-chunk mapper 250 subdivides the shot sequence 220 into multiple shot sequences 220.

As shown for the collation strategy 242(4) of integer, the shot-to-chunk mapper 250 assigns the shot sequences 220 (1)-220(4) to the chunk 270(1). Subsequently, the shot-to-chunk mapper 250 assigns the shot sequences 220(5)-220(7) to the chunk 270(2). The shot-to-chunk mapper 250 then assigns the shot sequences 220(8)-220(10) to the chunk 270(3). Finally, the shot-to-chunk mapper 250 assigns the shot sequence 220(11) to the chunk 270(4). Accordingly, for the collation strategy 242(3) of integer, the total number of chunks 270 is equal to four and the size of each of the chunks 270 varies from the sizes of the other chunks 270.

In alternate embodiments, the collation criteria 240 may include any number and type of criteria that the shot-to-chunk mapper 250 may apply in conjunction with any number of the different collation strategies 242 and/or any of the other collation criteria 240. For instance, in some embodiments, one of the collation criteria 240 may be a maximum chunk size that the shot-to-chunk mapper 250 applies irrespective of the collation strategy 242. In such embodiments, the shot-to-chunk mapper 250 subdivides each of the shot sequences 220 that exceeds the maximum chunk size into multiple chunks 270, where the size of each of the multiple chunks 270 does not exceed the maximum chunk size. Advantageously, enforcing a maximum chunk size ensures that any shot sequence 220 that is significantly longer than the other shot sequences 220 does not create a bottleneck in the parallel encoder 160.

Figure 4A:
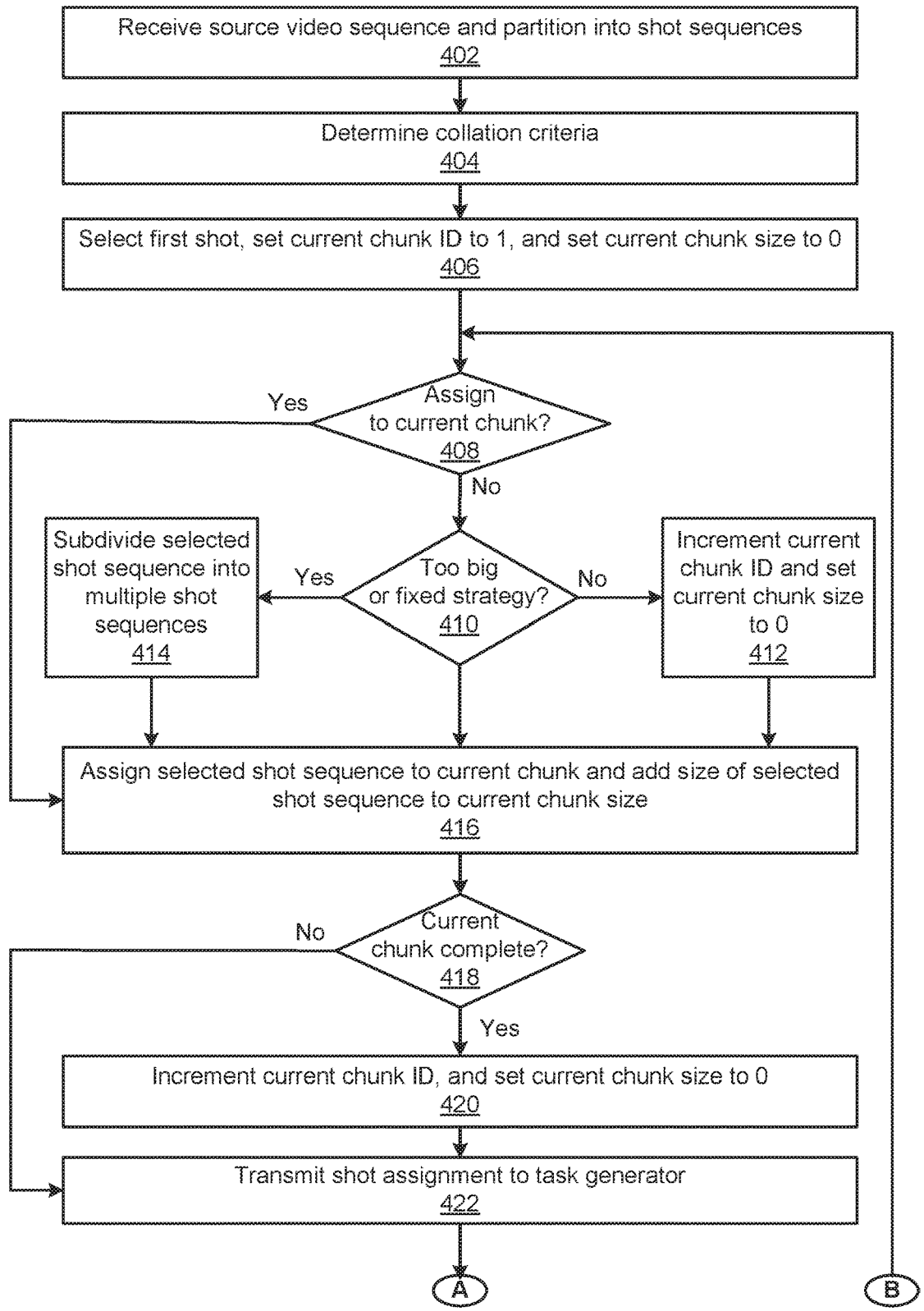
FIGS. 4A-B set forth a flow diagram of method steps for encoding a source video sequence, according to various embodiments of the present invention.
Figure 4B:
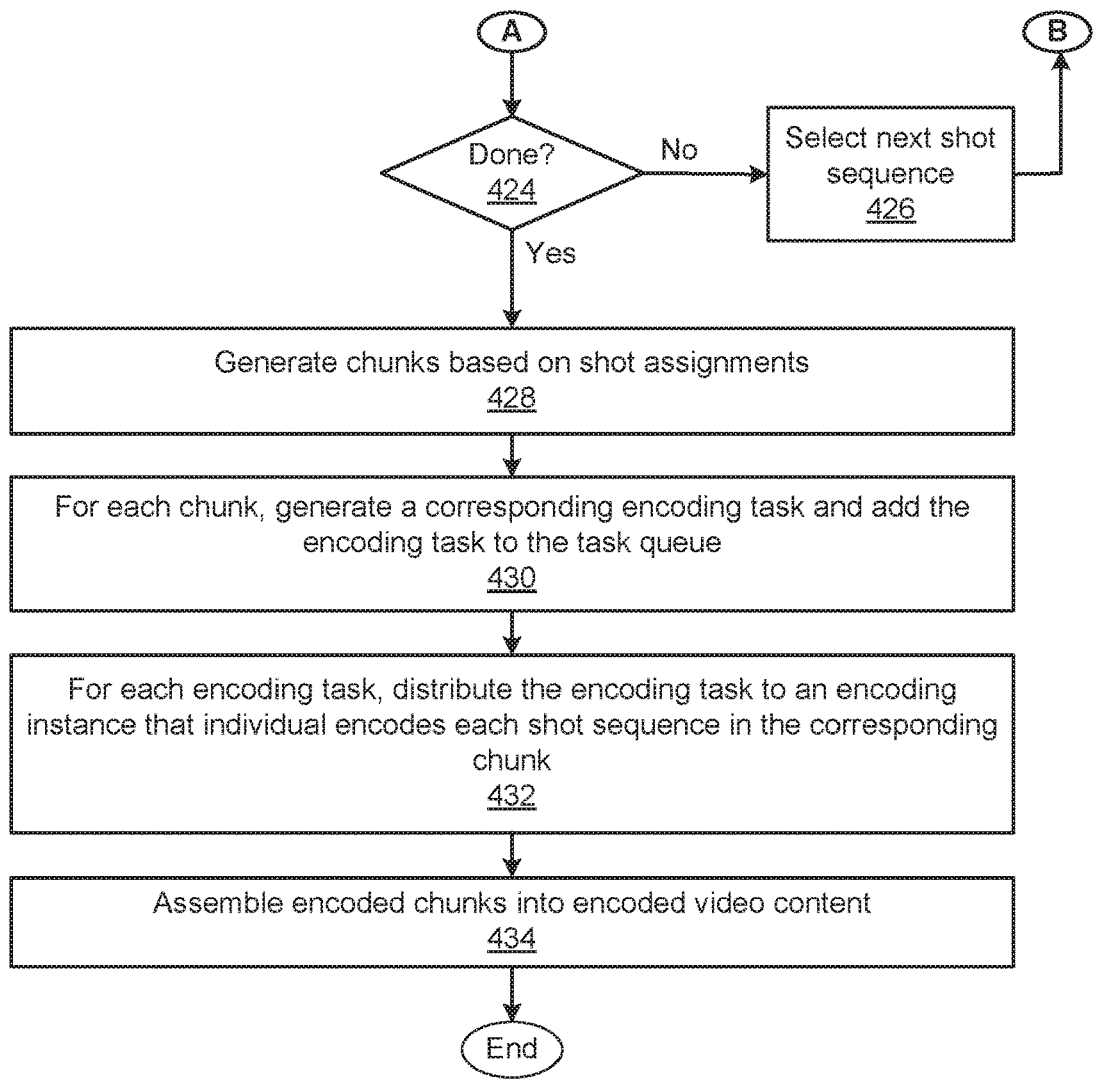

FIGS. 4A-B set forth a flow diagram of method steps for encoding a source video sequence, according to various embodiments of the present invention. Although the method steps are described with reference to the systems of FIGS. 1-3 persons skilled in the art will understand that any system configured to implement the method steps, in any order, falls within the scope of the present invention.

As shown, a method 400 begins at step 402, where the shot analyzer 210 receives the source video sequence 120 and partitions the source video sequence 120 into the shot sequences 220. At step 404, the strategy engine 230 determines the collation criteria 240 based on analyzing the shot sequences 220 and the resource constraints 142. The collation criteria 240 include, without limitation, the collation strategy 242 and any number (including zero) of additional constraints associated with the collation strategy 242. For example, if the strategy engine 230 determines that the collation strategy 242 is equal to fixed or integer, then the strategy engine 230 also calculates the target chunk size 244 and the leeway 246.

In alternate embodiments, the strategy engine 230 may determine any number and types of the collation criteria 240 in any technically feasible fashion based on any amount and type of data. For example, the strategy engine 230 could receive values for the collation strategy 242 and a maximum chunk size via a graphical user interface (GUI).

At step 406, the shot collation application 140 selects the first shot sequence 220 included in the source video sequence 120, sets the current chunk identifier 252 equal to 1, and sets the current chunk size 254 equal to 0. At step 408, the shot-to-chunk mapper 250 determines whether to assign the entire selected shot sequence 220 to the current chunk 270 based on the collation criteria 240 and, optionally, the current chunk size 254. More specifically, the shot-to-chunk mapper 250 determines whether assigning the entire selected shot sequence 220 to the current chunk 270 would satisfy the collation criteria 240.

If the shot-to-chunk mapper 250 determines that assigning the entire selected shot sequence 220 to the current chunk 270 would satisfy the collation criteria 240, then the shot-to-chunk mapper 250 determines to assign the entire selected shot sequence 220 to the current chunk 270. If, however, the shot-to-chunk mapper 250 determines that assigning the entire selected shot sequence 220 to the current chunk 270 would not satisfy the collation criteria 240, then the shot-to-chunk mapper 250 determines not to assign the entire selected shot sequence to the current chunk 270.

If, at step 408, the shot-to-chunk mapper 250 determines not to assign the entire selected shot sequence 220 to the current chunk 270, then the method 400 proceeds to step 410. At step 410, the shot-to-chunk mapper 250 determines whether the size of the selected shot sequence 220 exceeds a maximum chunk size or the collation criteria 240 is equal to fixed. The shot-to-chunk mapper 250 may determine the maximum chunk size in any technically feasible fashion based on any number of the collation criteria 240. For example, the shot-to-chunk mapper 250 could perform an addition operation between the target chunk size 244 and the leeway 246 to compute the maximum chunk size.

If, at step 410, the shot-to-chunk mapper 250 determines that the size of the selected shot sequence 220 does not exceed the maximum chunk size and the collation strategy 242 is not equal to fixed, then the method 400 proceeds to step 412. At step 412, the shot-to-chunk mapper 250 increments the current chunk identifier 252 and sets the current chunk size 254 equal to zero. The method 400 then proceeds directly to step 416.

If, however, at step 410, the shot-to-chunk mapper 250 determines that the size of the selected shot sequence 220 exceeds the maximum chunk size or the collation strategy 242 is equal to fixed, then the method 400 proceeds directly to step 414. At step 414, the shot-to-chunk mapper 250 subdivides the selected shot sequence 220 into multiple shot sequences 220 based on the target chunk size 244. As a result, the total number of shot sequences 220 included in the source video sequence 120 increases. The shot-to-chunk mapper 250 may subdivide the selected shot sequence 220 into multiple shot sequences 220 in any technically feasible fashion.

For instance, in some embodiments, the shot-to-chunk mapper 250 determines the initial subset of frames included in the selected shot sequence 220 that can be assigned to the current chunk 270 while satisfying the collation criteria 240. Then, the shot-to-chunk mapper 250 selects the frames included in the selected shot sequence 220 that are not also included in the initial subset. The shot-to-chunk mapper 250 assigns the selected frames to one or more new shot sequences 220 based on the target chunk size 244. Finally, the shot-to-chunk mapper 250 deletes the selected frames from the selected shot sequence 220.

Returning now to step 408, if the shot-to-chunk mapper 250 determines to assign the entire selected shot sequence 220 to the current chunk 270, then the method 400 proceeds directly to step 416.

At step 416, the shot-to-chunk mapper 250 generates a new shot assignment 260 that assigns the selected shot sequence 220 to the current chunk 270, and adds the size of the selected shot sequence 220 to the current chunk size 254. At step 418, the shot-to-chunk mapper 250 determines whether the current chunk 270 is complete. The shot-to-chunk mapper 250 may determine whether the current chunk 270 is complete in any technically feasible fashion.

For example, if the collation strategy 242 is equal to individual, then the shot-to-chunk mapper 250 determines that the current chunk 270 is complete when one shot sequence 220 is assigned to the current chunk 270. In some embodiments, if the collation strategy 242 is equal to integer, then the shot-to-chunk mapper 250 determines that the current chunk 270 is complete when the size of the current chunk 270 lies within the leeway 246 of the target chunk size 244.

If, at step 418, the shot-to-chunk mapper 250 determines that the current chunk 270 is not complete, then the method proceeds directly to step 422. If, however, at step 418, the shot-to-chunk mapper 250 determines that the current chunk 270 is complete, then the method proceeds to step 420. At step 420, the shot-to-chunk mapper 250 increments the current chunk identifier 252 and sets the current chunk size 254 equal to zero.

At step 422, the shot-to-chunk mapper 250 transmits the new shot assignment 260 to the task generator 280. At step 424, the shot collation application 140 determines whether the selected shot sequence 220 is the last shot sequence 220 included in the source video sequence 120. If, at step 424, the shot collation application 140 determines that the selected shot sequence 220 is not the last shot sequence 220 included in the source video sequence 120, then the method 400 proceeds to step 426. At step 426, the shot collation application 140 selects the next shot sequence 220 included in the source video sequence 120. The method 400 then returns to step 408, where the shot-to-chunk mapper 250 generates a new shot assignment 260.

If, however, at step 424, the shot collation application 140 determines that the selected shot sequence 220 is the last shot sequence 220 included in the source video sequence 120, then the method 400 proceeds directly to step 428. At step 428, the task generator 280 generates the chunks 270 based on the shot assignments 260. At step 430, for each of the chunks 270, the task generator 280 generates a corresponding encoding task 150 and adds the encoding task 150 to the task queue 132.

At step 432, for each of the encoding tasks 150, the encoding task 150 is distributed to an encoding instance. In response to receiving a particular encoding task 150(x), the encoding instance sequentially and individually encodes each of the shot sequences 220 included in the corresponding chunk 270(x) to generate the encoded chunk 170(x). At step 434, the assembler 180 composites the encoded chunks 170 to generate the encoded video sequence 190. The method 400 then terminates.

Advantageously, the encoded shot sequences 220 within the encoded video sequence 190 may be encoded with potentially different encoding parameters. Consequently, the distributed encoding system 100 provides the encoding efficiency associated with a conventional shot-based distribution system while optionally reducing the number of individual encoding tasks 150.

In sum, the disclosed techniques may be used to efficiently encode source video sequences for real-time delivery. A collation application includes, without limitation, a shot analyzer, a strategy engine, a shot-to-chunk mapper, and a shot collation application. In operation, the shot analyzer partitions a source video sequence into shot sequences and transmits the shot sequences to the strategy engine. Upon receiving the shot sequences, the strategy engine evaluates characteristics of the shot sequences in conjunction with resource constraints to select a collation strategy that specifies how the collation application collates shots into chunks.

For a collation strategy of integer, the shot-to-chunk mapper determines a target chunk size and sequentially assigns an integer number of shot sequences to each chunk while ensuring that the size of the chunk does not exceed the target chunk size. For a collation strategy of fixed, the shot-to-chunk mapper selects a target chunk size and sequentially assigns shot sequences to each chunk, subdividing shot sequences as necessary to ensure that the size of the chunk equals the target chunk size. For a collation strategy of all, the shot-to-chunk mapper sequentially assigns all of the shot sequences to a single chunk. For a collation strategy of individual, the shot-to-chunk mapper sequentially assigns each shot sequence to a different chunk. As the task generator receives individual shot assignments from the shot-to-chunk mapper, the task generator generates one or more chunks. For each chunk, the task generator generates a corresponding encoding task and stores the encoding task in a task queue.

When an encoding instance included in a parallel encoder becomes available, a centralized messaging subsystem transmits the next encoding task from the task queue to the encoding instance. The encoding instance sequentially encodes each shot sequence included in the chunk associated with the encoding task. More specifically, for each shot sequence, the encoding instance selects shot-specific encoding parameters based on a target quality level and then encodes the shot sequence based on the shot-specific encoding parameters. In this fashion, the encoding instance generates an encoded chunk within which each shot sequence is individually encoded with potentially different encoding parameters. Finally, a chunk assembler composites the individual encoded chunks to generate the encoded video sequence.

Advantageously, the collation criteria enable the encoding system to efficiently perform shot-based encoding of the source video sequence while optimizing the use of the available resources. In particular, the number of separate encoding tasks required to distribute shot-based encoding work to the encoding instances is equal to the number of chunks, and the number of chunks is determined by the collation criteria. Consequently, resource inefficiencies attributable to the number of encoding tasks generated and processed by conventional shot-based distributed encoding systems may be mitigated via the collation criteria. Further, by selecting the collation strategy and/or target chunk size based on requirements associated with different encoders, the collation application enables streaming video providers to optimize real-time delivery of source video sequences using a wide variety of encoders.

1. In some embodiments, a computer-implemented method comprises assigning a first shot sequence included in a source video sequence to a first chunk; determining that a second shot sequence included in the source video sequence does not satisfy at least one collation criterion with respect to the first chunk; assigning the second shot sequence or a third shot sequence derived from the second shot sequence to a second chunk; causing a first encoding instance to independently encode each shot sequence assigned to the first chunk to generate a first encoded chunk; and causing a second encoding instance to independently encode each shot sequence assigned to the second chunk to generate a second encoded chunk, wherein the first encoded chunk and the second encoded chunk are combined to generate at least part of an encoded video sequence.

2. The computer-implemented method of clause 1, wherein determining that the second shot sequence does not satisfy the at least one collation criterion comprises performing an operation that adds the size of the first chunk and the size of the second shot sequence to generate a tentative size; and determining that the tentative size exceeds a maximum chunk size.

3. The computer-implemented method of clauses 1 or 2, wherein assigning the second shot sequence or the third shot sequence derived from the second shot sequence to the second chunk comprises partitioning the second shot sequence into the third shot sequence and a fourth shot sequence based on the size of the first chunk and the maximum chunk size; assigning the third shot sequence to the second chunk; and assigning the fourth shot sequence to a third chunk.

4. The computer-implemented method of any of clauses 1-3, wherein causing the first encoding instance to independently encode each shot sequence assigned to the first chunk comprises generating an encoding task based on the first chunk, and storing the encoding task in a task queue.

5. The computer-implemented method of any of clauses 1-4, wherein assigning the second shot sequence or a third shot sequence derived from the second shot sequence to a second chunk comprises determining that the size of the second shot sequence exceeds a maximum chunk size; partitioning the second shot sequence into the third shot sequence and a fourth shot sequence; and assigning the third shot sequence to the second chunk.

6. The computer-implemented method of any of clauses 1-5, further comprising, prior to assigning the first shot sequence, performing one or more scene detection operations to identify a plurality of shot sequences included in the source video sequence, wherein the plurality of shot sequences includes the first shot sequence and the second shot sequence.

7. The computer-implemented method of any of clauses 1-6, wherein the at least one collation criterion specifies a one-to-one mapping of shot sequences to chunks.

8. The computer-implemented method of any of clauses 1-7, further comprising, prior to assigning the first shot sequence, determining the at least one collation criterion based on at least one of the source video sequence and a resource constraint.

9. The computer-implemented method of any of clauses 1-8, further comprising, prior to causing the second encoding instance to independently encode each sequence assigned to the second chunk, determining that a fourth shot sequence included in the source video sequence satisfies the at least one collation criterion with respect to the second chunk; and assigning the fourth shot sequence to the second chunk.

10. In some embodiments, a computer-readable storage medium includes instructions that, when executed by a processor, cause the processor to perform the steps of determining that a first shot sequence included in a source video sequence satisfies one or more collation criteria with respect to a first chunk; assigning the first shot sequence to the first chunk; determining that a second shot sequence included in the source video sequence does not satisfy a first collation criterion included in the one or more collation criteria with respect to the first chunk; assigning the second shot sequence to a second chunk; causing a first encoding instance to independently encode each shot sequence assigned to the first chunk to generate a first encoded chunk; and causing a second encoding instance to independently encode each shot sequence assigned to the second chunk to generate a second encoded chunk, wherein the first encoded chunk and the second encoded chunk are combined to generate at least part of an encoded video sequence.

11. The computer-readable storage medium of clause 10, wherein determining that the second shot sequence does not satisfy the first collation criterion comprises performing an operation that adds the size of the first chunk and the size of the second shot sequence to generate a tentative size; and determining that the tentative size exceeds a maximum chunk size.

12. The computer-readable storage medium of clauses 10 or 11, further comprising, prior to causing the second encoding instance to independently encode each shot sequence assigned to the second chunk, determining that a third shot sequence does not satisfy the first collation criterion with respect to the second chunk; partitioning the third shot sequence into a fourth shot sequence and a fifth shot sequence based on the size of the second chunk and the maximum chunk size; assigning the fourth shot sequence to the second chunk; and assigning the fifth shot sequence to a third chunk.

13. The computer-readable storage medium of any of clauses 10-12, further comprising, prior to determining that the first shot sequence satisfies the one or more collation criteria, performing one or more scene detection operations to identify a plurality of shot sequences included in the source video sequence, wherein the plurality of shot sequences includes the first shot sequence and the second shot sequence.

14. The computer-readable storage medium of any of clauses 10-13, wherein the first collation criterion specifies a one-to-one mapping of shot sequences to chunks.

15. The computer-readable storage medium of any of clauses 10-14, wherein the first collation criterion specifies whether each shot sequence that is smaller than a chunk size maps to a single chunk.

16. The computer-readable storage medium of any of clauses 10-15, further comprising, prior to determining that the first shot sequence satisfies the one or more collation criteria, determining the first collation criterion based on at least one of the source video sequence and a resource constraint.

17. The computer-readable storage medium of any of clauses 10-16, wherein determining the first collation criterion comprises evaluating a plurality of shot sequences included in the source video sequence in conjunction with the resource constraint to determine a chunk size.

18. The computer-readable storage medium any of clauses 10-17, wherein the resource constraint comprises a memory bandwidth, the size of a task queue, or a maximum number of encoding tasks.

19. In some embodiments, a system comprises a memory storing a shot collation application; and a processor that is coupled to the memory, wherein, when executed by the processor, the shot collation application causes the processor to assign a first shot sequence included in a source video sequence to a first chunk; determine that a second shot sequence included in the source video sequence does not satisfy at least one collation criterion with respect to the first chunk; assign the second shot sequence to a second chunk; cause a first encoding instance to independently encode each shot sequence assigned to the first chunk to generate a first encoded chunk; and cause a second encoding instance that performs encoding operations substantially in parallel to the first encoding instance to independently encode each shot sequence assigned to the second chunk to generate a second encoded chunk, wherein the first encoded chunk and the second encoded chunk are combined to generate at least part of an encoded video sequence.

20. The system of clause 19, wherein the shot collation application causes the processor to determine that the second shot sequence does not satisfy the at least one collation criterion by performing an operation that adds the size of the first chunk and the size of the second shot sequence to generate a tentative size; and determining that the tentative size exceeds a maximum chunk size.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   assigning a first shot sequence included in a source video sequence to a first chunk;
   determining that a second shot sequence included in the source video sequence does not satisfy at least one collation criterion with respect to the first chunk;
   assigning the second shot sequence or a third shot sequence derived from the second shot sequence to a second chunk;
   causing a first encoding instance to generate a first encoded chunk by independently encoding each shot sequence assigned to the first chunk based on encoding parameters determined for the shot sequence; and
   causing a second encoding instance to generate a second encoded chunk by independently encoding each shot sequence assigned to the second chunk based on encoding parameters determined for the shot sequence, wherein the first encoded chunk and the second encoded chunk are combined to generate at least part of an encoded video sequence.

2. The computer-implemented method of claim 1, wherein determining that the second shot sequence does not satisfy the at least one collation criterion comprises:
   performing an operation that adds the size of the first chunk and the size of the second shot sequence to generate a tentative size; and
   determining that the tentative size exceeds a maximum chunk size.

3. The computer-implemented method of claim 2, wherein assigning the second shot sequence or the third shot sequence derived from the second shot sequence to the second chunk comprises:
   partitioning the second shot sequence into the third shot sequence and a fourth shot sequence based on the size of the first chunk and the maximum chunk size;
   assigning the third shot sequence to the second chunk; and
   assigning the fourth shot sequence to the first chunk.

4. The computer-implemented method of claim 1, wherein causing the first encoding instance to generate the first encoded chunk by independently encoding each shot sequence assigned to the first chunk comprises generating an encoding task based on the first chunk, and storing the encoding task in a task queue.

5. The computer-implemented method of claim 1, wherein assigning the second shot sequence or the third shot sequence derived from the second shot sequence to the second chunk comprises:
   determining that the size of the second shot sequence exceeds a maximum chunk size;
   partitioning the second shot sequence into the third shot sequence and a fourth shot sequence; and
   assigning the third shot sequence to the second chunk.

6. The computer-implemented method of claim 1, further comprising, prior to assigning the first shot sequence, performing one or more scene detection operations to identify a plurality of shot sequences included in the source video sequence, wherein the plurality of shot sequences includes the first shot sequence and the second shot sequence.

7. The computer-implemented method of claim 1, wherein the at least one collation criterion specifies a one-to-one mapping of shot sequences to chunks.

8. The computer-implemented method of claim 1, further comprising, prior to assigning the first shot sequence, determining the at least one collation criterion based on at least one of the source video sequence or a resource constraint.

9. The computer-implemented method of claim 1, further comprising, prior to causing the second encoding instance to generate the second encoded chunk by independently encoding each sequence assigned to the second chunk:
   determining that a fourth shot sequence included in the source video sequence satisfies the at least one collation criterion with respect to the second chunk; and
   assigning the fourth shot sequence to the second chunk.

10. A non-transitory computer-readable storage medium including instructions that, when executed by a processor, cause the processor to perform the steps of:
    determining that a first shot sequence included in a source video sequence satisfies one or more collation criteria with respect to a first chunk;
    assigning the first shot sequence to the first chunk;
    determining that a second shot sequence included in the source video sequence does not satisfy a first collation criterion included in the one or more collation criteria with respect to the first chunk;

assigning the second shot sequence to a second chunk;
causing a first encoding instance to generate a first encoded chunk by independently encoding each shot sequence assigned to the first chunk based on encoding parameters determined for the shot sequence; and
causing a second encoding instance to generate a second encoded chunk by independently encoding each shot sequence assigned to the second chunk based on encoding parameters determined for the shot sequence, wherein the first encoded chunk and the second encoded chunk are combined to generate at least part of an encoded video sequence.

11. The computer-readable storage medium of claim 10, wherein determining that the second shot sequence does not satisfy the first collation criterion comprises:
performing an operation that adds the size of the first chunk and the size of the second shot sequence to generate a tentative size; and
determining that the tentative size exceeds a maximum chunk size.

12. The computer-readable storage medium of claim 11, further comprising, prior to causing the second encoding instance to independently encode each shot sequence assigned to the second chunk:
determining that a third shot sequence does not satisfy the first collation criterion with respect to the second chunk;
partitioning the third shot sequence into a fourth shot sequence and a fifth shot sequence based on the size of the second chunk and the maximum chunk size;
assigning the fourth shot sequence to the second chunk; and
assigning the fifth shot sequence to a third chunk.

13. The computer-readable storage medium of claim 10, further comprising, prior to determining that the first shot sequence satisfies the one or more collation criteria, performing one or more scene detection operations to identify a plurality of shot sequences included in the source video sequence, wherein the plurality of shot sequences includes the first shot sequence and the second shot sequence.

14. The computer-readable storage medium of claim 10, wherein the first collation criterion specifies a one-to-one mapping of shot sequences to chunks.

15. The computer-readable storage medium of claim 10, wherein the first collation criterion specifies whether each shot sequence that is smaller than a chunk size maps to a single chunk.

16. The computer-readable storage medium of claim 10, the steps further comprising, prior to determining that the first shot sequence satisfies the one or more collation criteria, determining the first collation criterion based on at least one of the source video sequence or a resource constraint.

17. The computer-readable storage medium of claim 16, wherein determining the first collation criterion comprises evaluating a plurality of shot sequences included in the source video sequence in conjunction with the resource constraint to determine a chunk size.

18. The computer-readable storage medium of claim 17, wherein the resource constraint comprises a memory bandwidth, the size of a task queue, or a maximum number of encoding tasks.

19. A system, comprising:
a memory storing a shot collation application; and
a processor that is coupled to the memory, wherein, when executed by the processor, the shot collation application causes the processor to:
assign a first shot sequence included in a source video sequence to a first chunk,
determine that a second shot sequence included in the source video sequence does not satisfy at least one collation criterion with respect to the first chunk,
assign the second shot sequence to a second chunk,
cause a first encoding instance to generate a first encoded chunk by independently encoding each shot sequence assigned to the first chunk based on encoding parameters determined for the shot sequence, and
cause a second encoding instance that performs encoding operations substantially in parallel to the first encoding instance to generate a second encoded chunk by independently encoding each shot sequence assigned to the second chunk based on encoding parameters determined for the shot sequence,
wherein the first encoded chunk and the second encoded chunk are combined to generate at least part of an encoded video sequence.

20. The system of claim 19, wherein the shot collation application causes the processor to determine that the second shot sequence does not satisfy the at least one collation criterion by:
performing an operation that adds the size of the first chunk and the size of the second shot sequence to generate a tentative size; and
determining that the tentative size exceeds a maximum chunk size.

* * * * *